(12) United States Patent
Yokogawa

(10) Patent No.: US 8,275,952 B2
(45) Date of Patent: Sep. 25, 2012

(54) DATA RECORDING DEVICE AND DATA RECORDING METHOD CONFIGURED TO SORT DATA BY FRAME ID PRIOR TO RECORDING

(75) Inventor: Nobuhiro Yokogawa, Toyota (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 1328 days.

(21) Appl. No.: 11/666,916

(22) PCT Filed: Nov. 1, 2005

(86) PCT No.: PCT/JP2005/020405
§ 371 (c)(1),
(2), (4) Date: May 3, 2007

(87) PCT Pub. No.: WO2006/051763
PCT Pub. Date: May 18, 2006

(65) Prior Publication Data
US 2007/0300024 A1    Dec. 27, 2007

(30) Foreign Application Priority Data
Nov. 11, 2004 (JP) ................................. 2004-327857

(51) Int. Cl.
*G06F 12/00* (2006.01)
(52) U.S. Cl. ................ 711/154; 711/161; 711/E12.001; 701/33.4

(58) Field of Classification Search .................. 711/161, 711/154, E12.001; 701/33.4
See application file for complete search history.

(56) References Cited

U.S. PATENT DOCUMENTS

| 6,494,408 | B2 * | 12/2002 | Katzer | 246/1 R |
| 2006/0142914 | A1 * | 6/2006 | Yokogawa | 701/35 |

FOREIGN PATENT DOCUMENTS

| GB | 2088569 | * | 6/1982 |
| JP | A 2002-26924 | | 1/2002 |
| JP | A 2002-330149 | | 11/2002 |
| JP | A-2004-048350 | | 2/2004 |
| KR | 2003-0070010 | | 8/2003 |
| WO | WO 02/31793 A2 | | 4/2002 |
| WO | WO 2010060763 | * | 6/2010 |

OTHER PUBLICATIONS

Yeo, C.K. "A Unified Messaging System on the Internet," *Microprocessors and Microsystems*, vol. 24, No. 10, pp. 523-530 (2001).

(Continued)

*Primary Examiner* — Pierre-Michel Bataille
(74) *Attorney, Agent, or Firm* — Oliff & Berridge, PLC

(57) ABSTRACT

In a data recording device which records a plurality of data items of different kinds, one or plurality of nodes set the plurality of data items to data frames with frame IDs uniquely assigned for respective kinds of the data items, and transmit the data frames to a multiplex communication line. A recording unit assorts the data items contained in the data frames sent from the multiplex communication line, in accordance with the frame IDs of the data frames, and stores the assorted data items in a storage unit.

8 Claims, 3 Drawing Sheets

OTHER PUBLICATIONS

Chen, J., et al. "Real-Time Capability Analysis for Switch Industrial Ethernet Traffic Priority-Based[1]," *Proceedings of the 2002 IEEE International Conference on Control Applications,* vol. 1, pp. 525-529 (2002).

Soo, H. "Analysis of Nonpreemptive Priority Queueing of DiffServ Networks with Bulk Arrivals," *AEU International Journal of Electronics and Communications,* vol. 57, No. 6, pp. 409-414 (2003).

Chenyu, et al. "A New Queuing and Scheduling Model Under DiffServ Architecture," *Information Reuse and Integration,* pp. 436-443 (2003).

Wedlund, et al. "SDP Extensions for Fax Over IP Using T.38," *Internet Engineering Task Force Internet Draft,* vol. mmusic, pp. 1-4 (1998).

\* cited by examiner

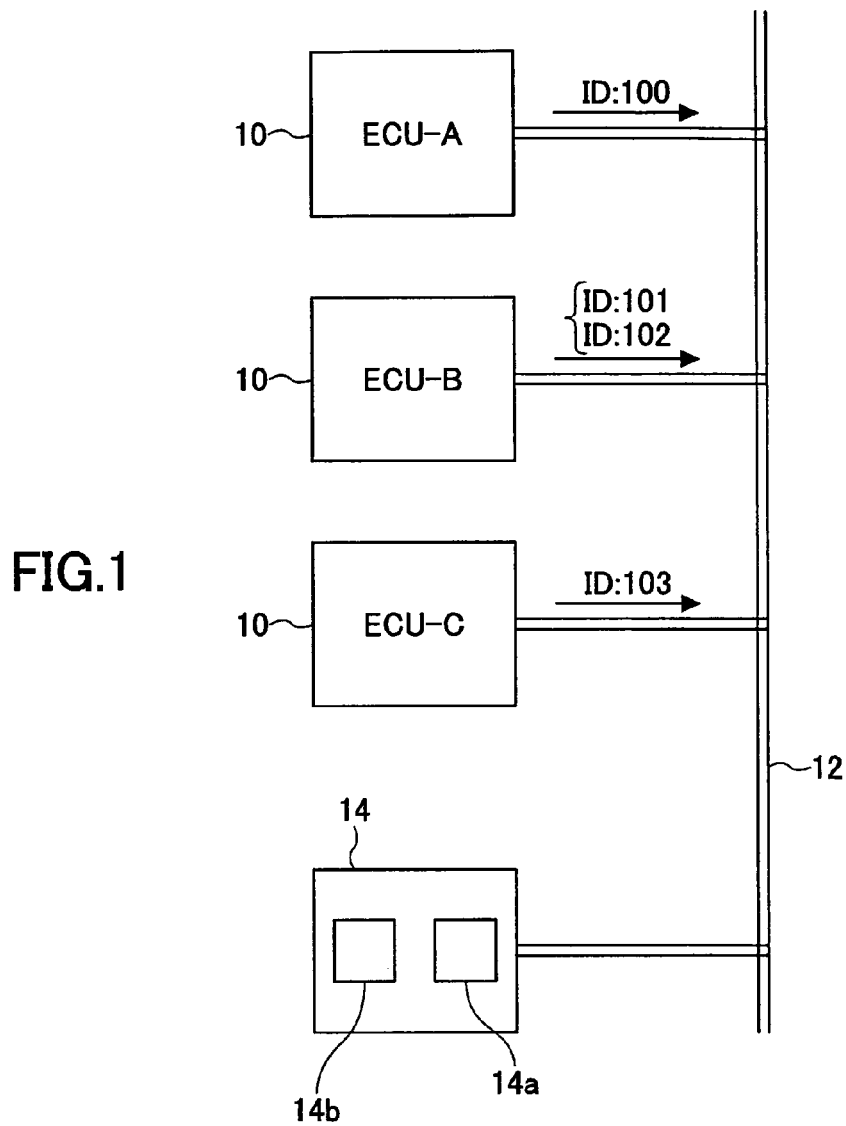

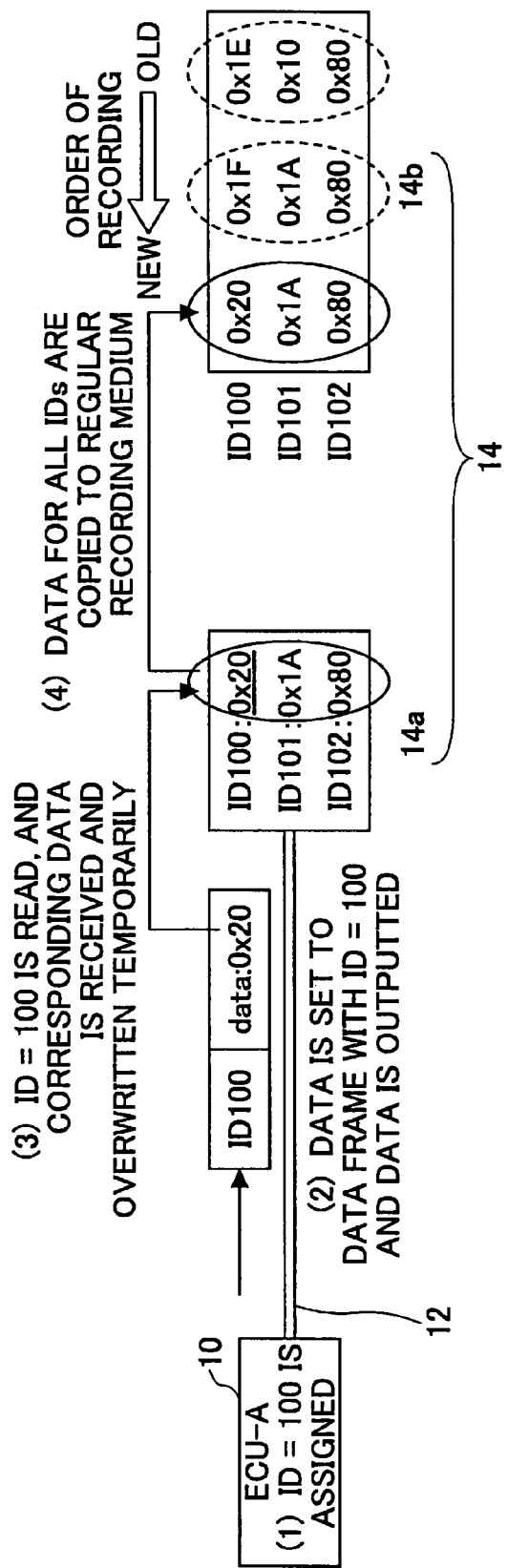

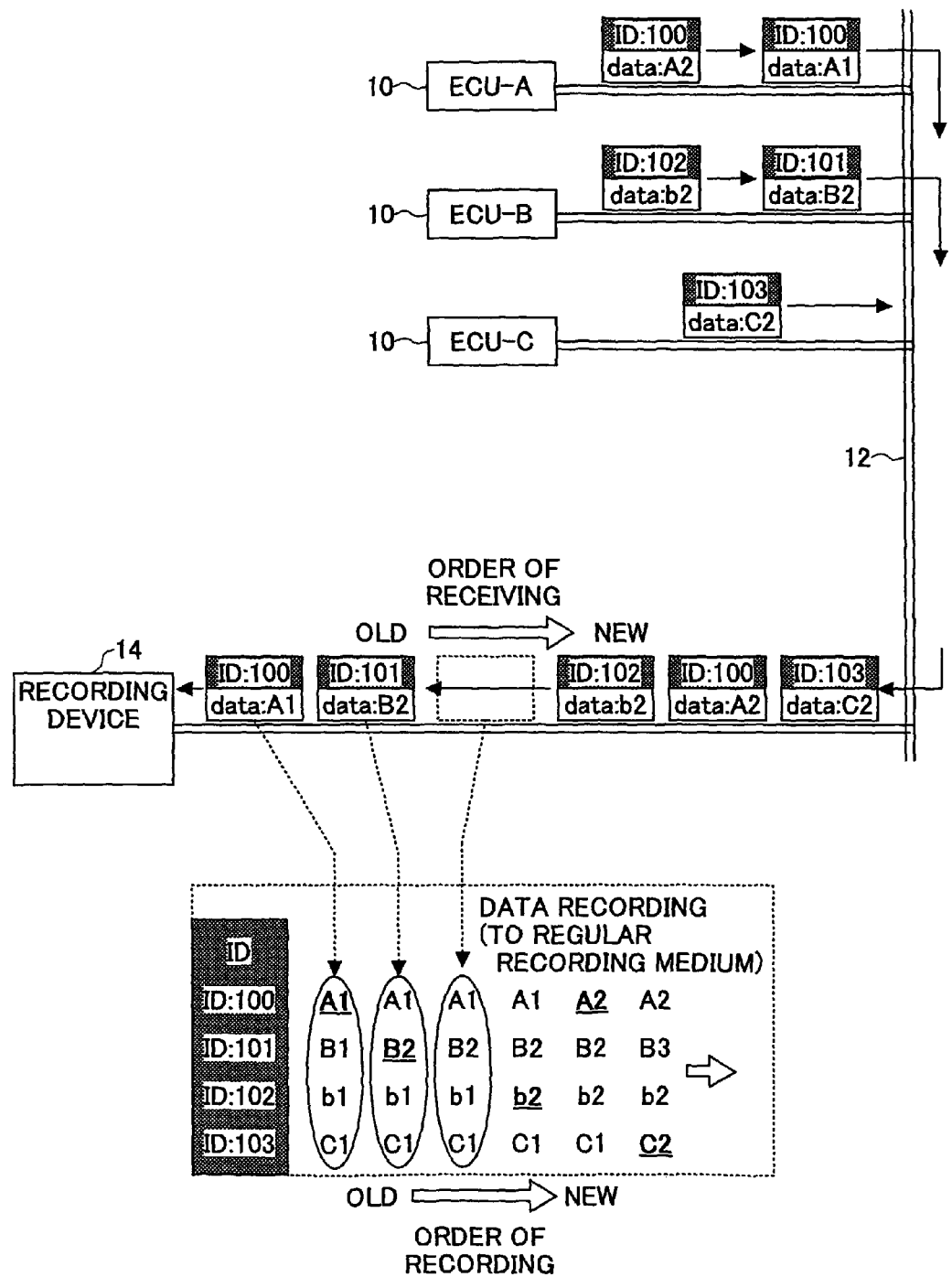

DATA RECORDING DEVICE AND DATA RECORDING METHOD CONFIGURED TO SORT DATA BY FRAME ID PRIOR TO RECORDING

TECHNICAL FIELD

The present invention generally relates to a data recording device and data recording method, and more particularly to a data recording device and method which is appropriate for recording a plurality of data items of different kinds transmitted from a plurality of nodes which are interconnected by a multiplex communication line in an in-vehicle network.

BACKGROUND ART

Conventionally, a recording device system in which a recording device records a plurality of data items transmitted from a plurality of control units which are interconnected by a multiplex connection line in an in-vehicle LAN is known. The control units constitute the nodes of the in-vehicle LAN. For example, refer to Japanese Laid-Open Patent Application No. 2002-330149.

In a case of the system of Japanese Laid-Open Patent Application No. 2002-330149, when the vehicle starts operation, the plurality of data items addressed to the recording device are outputted, at a predetermined timing (or periodically), to the in-vehicle LAN from the plurality of control units (such as an engine control unit, an ABS control unit, and a door control unit). The recording device collects and records the plurality of data items.

However, the above-mentioned system does not take into consideration the rule of how or in what sequence the recording device should collect the plurality of data items of different kinds sent from the plurality of control units. For example, when a malfunction diagnosis of the vehicle is performed, it is necessary to collect the plurality of data items which are outputted in the almost same period. However, if the individual rules between the recording device and the respective control units are inherently defined, the rule of collecting the plurality of data items of different kinds becomes complicated, and the versatility of the system is lost. As the result, the collection of the plurality of data items of different kinds becomes difficult.

DISCLOSURE OF THE INVENTION

An object of the present invention is to provide an improved data recording device and method in which the above-mentioned problems are eliminated.

Another object of the present invention is to provide a data recording device and method which is able to easily collect and record a plurality of data items of different kinds by using a simple, general-purpose configuration.

In order to achieve the above-mentioned objects, the present invention provides a data recording device which records a plurality of data items of different kinds, the data recording device comprising: one or plurality of nodes setting the plurality of data items to data frames with frame IDs uniquely assigned for respective kinds of the data items, and transmitting the data frames to a multiplex communication line; and a recording unit assorting the data items contained in the data frames sent from the multiplex communication line, in accordance with the frame IDs of the data frames, and storing the assorted data items in a storage unit.

In order to achieve the above-mentioned objects, the present invention provides a data recording method which records a plurality of data items of different kinds, the data recording method comprising: setting the plurality of data items of one or plurality of nodes to data frames with frame IDs uniquely assigned for respective kinds of the data items; transmitting the data frames to a multiplex communication line; assorting the data items contained in the data frames sent from the multiplex communication line, in accordance with the frame IDs of the data frames; and storing the assorted data items in a storage unit.

According to the above-mentioned data recording device and method of the invention, the frame IDs which are uniquely assigned for the respective kinds of the data items are attached to the data frames which are transmitted from the one or plurality of nodes to the multiplex communication line. When the data frames are transmitted from the multiplex communication line to the recording unit, the frame IDs attached to the data frames are extracted and analyzed, and the data items are assorted from the data frames for every frame ID, so that the assorted data items are stored in the storage unit.

There is no need for the data recording device of the invention to use the individual rules inherently defined between the recording device 14 and the respective control units, and the data recording device of the invention follows the common rule of collecting the data items. Thus, it is possible to construct a simple, general-purpose data recording system.

The above-mentioned data recording device and method of the invention may be configured so that the one or plurality of nodes transmit the data frames containing the data items with the uniquely assigned frame IDs, to the multiplex communication line at predetermined intervals. Since one-way communication in which the data frames are transmitted from the one or plurality of nodes to the recording unit is realized, it is possible to reduce the traffic on the multiplex communication line when compared with the two-way communication in which the transmission of the data items to be recorded is requested to the side of the nodes from the side of the recording unit.

The above-mentioned data recording device and method of the invention may be configured so that the recording unit copies the data items of all the frame IDs from the storage unit and collectively stores the copied data items of all the frame IDs into a recording medium at a predetermined timing. It is possible for the above-mentioned data recording device and method of the invention to store the plurality of data items of different kinds in the recording medium wherein the plurality of data items are collected in the almost same period.

According to the data recording device and method of the present invention, it is possible to easily collect the plurality of data items of different kinds by using a simple, general-purpose system composition.

BRIEF DESCRIPTION OF THE DRAWINGS

FIG. 1 is a block diagram of a recording device system in which the data recording device of the invention is embodied.

FIG. 2 is a diagram for explaining the assignment of frame IDs for respective kinds of data of a plurality of control units (nodes) in the recording device system of this embodiment.

FIG. 3 is a diagram for explaining the procedure in which a data item is transmitted from one of the plurality of nodes in the recording device system of this embodiment and the data item is recorded in the recording device.

FIG. 4 is a diagram for explaining the procedure in which the plurality of data items transmitted from the plurality of nodes in the recording device system of this embodiment are recorded in the recording device, respectively.

BEST MODE FOR CARRYING OUT THE INVENTION

A description will now be given of an embodiment of the invention with reference to the accompanying drawings.

FIG. 1 shows a recording device system in which the data recording device of the invention is embodied. As shown in FIG. 1, the recording device system of this embodiment comprises a plurality of nodes 10 which are constituted by ECUs or intelligent sensors, a multiplex communication line 12 which interconnects the plurality of nodes 10, and a recording device 14 which is also connected to the multiplex communication line 12. The ECU is the abbreviation of electronic control unit, and this ECU is mainly formed by a microcomputer and provided in any of various control units of an automotive vehicle.

The recording device system of FIG. 1 is a system in which the recording device 14 collects and records a plurality of data items from the plurality of nodes 10 for the purpose of performing a malfunction diagnosis of the vehicle.

The multiplex communication line 12 is a shared bus which is made of a single line or a twisted pair wire in a CAN (controller area network). The multiplex communication line 12 makes it possible to multiplex and transmit the plurality of data items from the plurality of nodes 10, through time-division multiplexing according to a predetermined communication protocol (multi-channel).

One of the plurality of data items transmitted from one of the plurality of nodes 10 is transmitted to another node 10 or the recording device 14 via the multiplex communication line 12.

Specifically, the plurality of nodes 10 may include a steering angle sensor which outputs a signal indicative of a steering angle, a yaw rate sensor which outputs a signal indicative of a yaw rate created around the axis of the center of gravity of the vehicle, an engine ECU which performs engine control based on a throttle opening, an accelerator opening, an engine water temperature, etc., an VSC (vehicle stability control) ECU which stabilizes the cornering action of the vehicle based on the wheel speed, the yaw rate, and the steering angle, a transmission ECU which controls the shift position of the vehicle based on a shift operation position etc., a brake ECU which controls the braking force of the vehicle based on the braking force and the steering angle, an automatic air-conditioner ECU which controls the air conditioning in the vehicle based on the air-conditioner operation switch and the in-vehicle temperature, and a power-steering ECU which controls the steering assist power based on the steering angle.

Each of the plurality of nodes 10 has a microcomputer with a built-in controller, and a communication module connected to the microcomputer, respectively. The microcomputer controls the controller according to the communication protocol of the multiplex communication line 12. The microcomputer digitizes the output data to be outputted from that node 10, and transmits the digital output data to another node 10 via the multiplex communication line 12. Also, the microcomputer decodes the input data received from another node 10 via the multiplex communication line 12, and performs the control of that node based on the decoded input data.

The communication module is controlled by the controller so that the communication module transmits the data of that node 10 to another node 10, or receives the data being transmitted to that node 10 from another node 10. Each of the respective nodes 10 performs the control of that node based on the data received from another node 10 or based on the state of the sensor or switch connected to that node 10, respectively.

A specific node 10 among the plurality of nodes 10 transmits the necessary data to another specific node 10 or receives the necessary data from another specific node 10 periodically (for example, for every 50 ms). For example, the VSC ECU, the brake ECU, and the engine ECU share the information of the wheel speed which is detected by the brake ECU, or share the driving torque for stabilizing the cornering action which is determined by the VSC-ECU, and the control command value of the braking force. In addition, the engine ECU and the automatic air-conditioner ECU share the information of the engine water temperature detected by the engine ECU. These control data are transmitted from the source node 10 detecting the data to the destination nodes 10 which share the data, and they are used for the control in the destination nodes.

The recording device 14 also has a microcomputer with a built-in controller, and a communication module connected to the microcomputer. The recording device 14 controls the controller according to the communication protocol of the multiplex communication line 12, so that the communication module receives the data addressed to the recording device 14 and transmitted from each node 10 via the multiplex communication line 12, and the recording device 14 records the data.

Specifically, the recording device 14 comprises a temporary storage data table 14a and a regular recording medium 14b. The temporary storage data table 14a temporarily stores one or more data items transmitted from any of the nodes 10. The regular recording medium 14b is, for example, a hard disk, and stores periodically the data items stored in the temporary storage data table 14a. In the recording device 14, the data items transmitted from the nodes 10 are first stored in the temporary storage data table 14a temporarily, and they are stored in the regular recording medium 14b periodically.

Each node 10 transmits the data which is to be recorded in the recording device 14 for performing a malfunction diagnosis of the vehicle, to the recording device 14 via the multiplex communication line 12.

The data which is transmitted to the multiplex communication line 12 by each node 10 is formed into a data frame having a predetermined format. For example, the data frame comprises the start of frame (SOF) which indicates the beginning of the data frame, the frame ID (identifier) which indicates the identification information (which also indicates the priority of data transmission) for distinguishing the transmitted data from other transmitted data, the data length code (DLC) which indicates the length of the transmitted data, the data field which indicates the content of the transmitted data (for example, the information of the wheel speed, the control command value of the driving torque, etc.), the CRC field which is used for checking a transmission error, the field which is used for confirming that the reception of the data is completed normally, and the end of frame (EOF) which indicates the end of the data frame.

The recording device system 10 of this embodiment is capable of transmitting the data which each node 10 transmits to other nodes 10 via the multiplex communication line 12 by using time-division multiplexing.

Namely, each node 10 can start the data transmission when other data items are not transmitted on the multiplex communication line 12. On the other hand, when data transmission is started by one or more other nodes 10 simultaneously, the data transmission is performed according to the priority of data transmission and each node is set in a standby condition for a fixed time until the data transmission by the other nodes is completed, and subsequently performs the data transmission by that node.

FIG. 2 shows the assignment of frame IDs for the respective kinds of data of the plurality of control units (the nodes 10) in the recording device system of this embodiment.

Suppose that the recording device system of this embodiment comprises the three control units at the three nodes 10 (which are ECU-A, ECU-B, and ECU-C), and the recording device 14, which are interconnected by the multiplex communication line 12.

In this embodiment, as shown in FIG. 1 and FIG. 2, ECU-A has a single data item (for example, the wheel speed) which should be recorded in the recording device 14, and the frame ID="100" is assigned to the data item of ECU-A. ECU-B has two data items of different kinds (for example, the engine speed and the throttle opening) which should be recorded in the recording device 14, and the frame IDs="101" and "102" are respectively assigned to the two data items of ECU-B. ECU-C has a single data item (for example, the yaw rate) which should be recorded in the recording device 14, and the frame ID="103" is assigned to the data item of ECU-C. The recording device system of this embodiment is provided so that, at predetermined regular or irregular intervals, ECU-A, ECU-B, and ECU-C respectively set the data items which should be recorded in the recording device 14, to data frames with the frame IDs which are uniquely assigned for the respective kinds of the data items of ECU-A, ECU-B, and ECU-C, and transmit the data frames to the multiplex communication line 12.

Next, the procedure of the recording device system of this embodiment in which the data items which are transmitted from the plurality of nodes 10 to the multiplex communication line 12 are recorded in the recording device 14 will be described.

FIG. 3 shows the procedure in which a data item is transmitted from one of the plurality of nodes 10 in the recording device system of this embodiment and the data item is recorded in the recording device 14. FIG. 4 shows the procedure in which the plurality of data items transmitted from the plurality of nodes 10 in the recording device system of this embodiment are recorded in the recording device 14, respectively.

In the procedure of FIG. 3, if the time at which a data item (which is "0x20" in FIG. 3) for being recorded in the recording device 14 should be transmitted to the multiplex communication line 12 is reached, ECU-A sets the data item to a data frame with the frame ID="100" assigned for the kind of the data item of ECU-A, and transmits the data frame to the multiplex communication line 12.

When the data frame from the multiplex communication line 12 is arrived at the recording device 14, the recording device 14 reads the frame ID contained in the data frame, determines that a data item addressed to the recording device 14 is contained in the data frame, based on the read frame ID, and receives the data item contained in the data frame.

And the recording device 14 updates (overwrites) and stores the data item of the frame ID="100" in the temporary storage data table 14a. As shown in FIG. 3, the data items of all the frame IDs which should be recorded in the recording device 14 are beforehand assorted by the respective frame IDs and temporarily stored in the temporary storage data table 14a.

In this case, the data items of the other frame IDs ("101"-"103") in the temporary storage data table 14a are maintained without being updated. In the example of FIG. 3, the data item with the frame ID="101" is maintained as "0x1A", and the data item with the frame ID="102" is maintained as "0x80".

In addition to the updating of data in the above-mentioned temporary storage data table 14a, the recording device 14 copies the data items of all the frame IDs from the temporary storage data table 14a, and stores the copied data items in the regular recording medium 14b periodically (for example, per second).

In this case, even if the data items of all the frame IDs in the temporary storage data table 14a are not updated at all, the periodical copying and storing is carried out by the recording device 14.

As shown in FIG. 3, all the data items which are copied from the temporary storage data table 14a and stored within a given past period are recorded in the regular recording medium 14b in a manner that the time of recording and the order of recording are recognizable.

For example, suppose that the data items are transmitted to the multiplex communication line 12 in the following sequence: the data item of the frame ID="100" sent by ECU-A (data content: A1), the data item of the frame ID="101" sent by ECU-B (data content: B2), the data item of the frame ID="102" sent by ECU-B (data content: b2), the data item of the frame ID="100" sent by ECU-A (data content: A2), and the data item of the frame ID="103" sent by ECU-C (data content: C2), as shown in FIG. 4. In this case, the recording device 14 receives the data items in the order which is the same as the order of transmission.

In this case, every time the recording device 14 receives one of the data items from ECU-A, ECU-B and ECU-C, the recording device 14 updates (overwrites) the received data item to the temporary storage data table 14a, and stores the updated temporary storage data table 14a.

For example, when the data item (data content: A1) of the frame ID="100" sent by ECU-A is received, the data item of the frame ID="100" in the temporary storage data table 14a is updated to "A1". After that, when the data item (data content: A2) of the frame ID="100" is received, the data item of the frame ID="100" in the temporary storage data table 14a is updated from "A1" to When the data item (data content: b2) of the frame ID="102" sent by ECU-B is received, the data item of the frame ID="102" in the temporary storage data table 14a is updated to "b2".

Suppose that the data item of the frame ID="101", stored in the temporary storage data table 14a, is "B1", the data item of the frame ID="102" is "b1", and the data item of the frame ID="103" is "C1". If the time at which the copying of all the data items to the regular recording medium 14b is reached after the data item of the frame ID="100" is updated to "A1", the recording device 14 copies the data items of all the frame IDs from the temporary storage data table 14a and collectively stores them in the regular recording medium 14b.

If the time at which the copying of the data items to the regular recording medium 14b should be performed is reached after the data item of the frame ID="101" in the temporary storage data table 14a is updated to "B2", the recording device 14 copies the data items of all the frame IDs from the temporary storage data table 14a and collectively stores them in the regular recording medium 14b.

On the other hand, if the time at which the copying of the data items to the regular recording medium 14b is reached while no data item is received from the nodes 10 and the data items in the temporary storage data table 14a are not updated after the data items are stored in the regular recording medium 14b, the recording device 14 copies the data items of all the frame IDs from the temporary storage data table 14a and collectively stores them in the regular recording medium 14b.

Subsequently, the data items of all the frame IDs in the temporary storage data table 14a will be continuously copied and collectively stored in the regular recording medium 14b periodically in a similar manner.

For example, the data items collected and stored in the regular recording medium 14b of the recording device 14 as described above are used for performing a malfunction diagnosis of the vehicle after a traffic accident occurs, in order to analyze the vehicle behavior and operational situation at the time of the accident. For example, the time of the accident is specified from the time of recording recorded in the regular recording medium 14b, and the vehicle situation at the time of the accident is specified from the wheel speed or the yaw rate.

As described in the foregoing, according to the recording device system of this embodiment, the plurality of nodes 10 and the recording devices 14 are interconnected by the multiplex communication line 12. The data items of different kinds addressed to the recording device 14 and sent from the plurality of nodes 10 are assorted from the data frames in accordance with the uniquely assigned frame IDs of the data frames, and transmitted to the multiplex communication line 12. The recording device 14 receives the data frames from the multiplex communication line 12 and assorts them for every frame ID so that the data items are recorded in the recording device 14. The data items recorded are collected from the data items of different kinds in the almost same period.

In this case, in order to record the data items in the recording device 14, what is necessary for the control units at the plurality of nodes 10 is to just set the data items in the data frames with the frame IDs assigned for the respective kinds of the data items of the nodes, and to transmit them to the multiplex communication line 12. What is necessary for the recording device 14 is just to assort the data items from the data frames addressed to the recording device 14 and receive them for every frame ID. It is not necessary that the recording device 14 grasps the source nodes 10 which have transmitted the data items.

There is no need for the recording device system of this embodiment to use the individual rules inherently defined between the recording device 14 and the respective control units, and the recording device system of this embodiment follows the common rule of collecting the data items. The development cost and the burden of the nodes 10 or the recording device 14 can be reduced remarkably, and it is possible to construct a simple, general-purpose data recording system.

The recording device system of this embodiment is configured so that it is installed in an automotive vehicle. Depending on the vehicle specifications, the configuration of the recording device system may vary. All the plurality of nodes 10 which transmit the data items recordable in the recording device 14 may be installed in the vehicle of a certain type. Only a part of the plurality of nodes 10 which transmit the data items recordable in the recording device 14 may be installed in the vehicle of another type.

However, in any case, the recording device 14 is provided so that, at every timing of the recording to the regular recording medium 14b, the data items of all the frame IDs, including the frame IDs for which the corresponding nodes 10 do not exist, in the temporary storage data table 14a are set in the data frames and collectively stored in the regular recording medium 14b. Since the initial data values continuously remain unchanged for the frame IDs of the data items to which the updating is not performed, no problem does not arise.

According to the recording device system of this embodiment, the data items transmitted from the plurality of nodes 10 of the vehicle are recorded in the recording device 14, and it is not necessary to modify the configuration or setting of the plurality of nodes 10 or the recording device 14 for every type of the automotive vehicles. It is possible to realize the data recording which can be flexibly suited to a change of the number of the nodes 10 being installed which is made in response to the vehicle type change, etc. Conversely, the recording device system of this embodiment can be flexibly suited to a change in the number of the nodes 10 and the recording device 14 which are interconnected by the multiplex communication line 12, and it is possible to construct a data recording system that is excellent in the expandability.

Furthermore, in the recording device system of this embodiment, the control units at the plurality of nodes 10 set the data items which should be recorded in the recording device 14 to the data frames with the unique frame IDs, and autonomously transmit them to the multiplex communication line 12 at the predetermined regular or irregular intervals.

That is, in this composition, when recording the data items in the recording device 14, the control unit at each node 10 simply transmits the data frame to the recording device 14, and the recording device 14 simply receives the data frame from each node 10, and the data communication between the node 10 and the recording device 14 is one-way communication.

For this reason, according to the recording device system of this embodiment, it is possible to reduce the traffic on the multiplex communication line 12 when compared with the two-way communication in which the transmission of the data items to be recorded is requested to the side of the nodes from the side of the recording device 14. For this reason, according to the recording device system of this embodiment, the frequency of transmission of the data items from the nodes 10 to the recording device 14 can be increased, and high-density recording of the data in the recording device 14 can be attained.

The recording device system in the above-mentioned embodiment corresponds to the data recording device in the claims, the recording device 14 in the above-mentioned embodiment corresponds to the recording unit in the claims, the regular recording medium 14b in the above-mentioned embodiment corresponds to the recording medium in the claims, and the temporary storage data table 14a in the above-mentioned embodiment corresponds to the storage unit in the claims, respectively.

The present invention is not limited to the above-described embodiment, and variations and modifications may be made without departing from the scope of the present invention. For example, in the above-mentioned embodiment, the recording device 14 is configured to record a plurality of data items of different kinds transmitted from a plurality of nodes 10 (ECU-A, ECU-B, and ECU-C). Alternatively, the recording device 14 may be configured to record a plurality of data items of different kinds transmitted from a single node 10.

Moreover, in the above-mentioned embodiment, all the data items within a past prescribed period are stored in the regular recording medium 14b of the recording device 14. However, when the regular recording medium 14b does not have the remaining storage capacity for storing new data items under the situation where the new data items should be stored, the recording device 14 may be configured to delete the older data items in the regular recording medium 14b sequentially from the oldest data item and store the new data items therein.

Moreover, in the above-mentioned embodiment, the network system is constructed with the plurality of electronic control units in the automotive vehicle which are interconnected by the multiplex communication line 14. Alternatively, the present invention is also applicable to a system other than the automotive vehicle in which a plurality of electronic control units are interconnected by a multiplex communication line.

Further, the present application is based upon and claims the benefit of priority from Japanese patent application No. 2004-327857, filed on Nov. 11, 2004, the entire contents of which are incorporated herein by reference.

The invention claimed is:

1. A data recording device provided for use in an automotive vehicle, the data recording device comprising:
one or a plurality of nodes interconnected by a multiplex communication line in an in-vehicle network of the vehicle, each of the one or a plurality of nodes configured to create data items each corresponding to one of one or a plurality of data types unique to each node, each of the one or a plurality of nodes setting each data item to a data frame with an assigned frame ID unique to each data item's corresponding data type, and transmitting the data frames to the multiplex communication line; and
a recording unit configured to assort the data items contained in the data frames sent from the multiplex communication line, in accordance with the frame IDs of the data frames, and configured to store the assorted data items in a storage unit of the recording unit,
wherein the recording unit copies the data items of all the frame IDs from the storage unit and stores the copied data items of all the frame IDs into a non-transitory recording medium of the recording unit at predetermined intervals, regardless of whether the data items of the frame IDs in the storage unit are updated or not.

2. The data recording device according to claim 1 wherein said one or plurality of nodes transmit the data frames containing the data items with the uniquely assigned frame IDs, to the multiplex communication line at predetermined intervals.

3. The data recording device according to claim 2 wherein the recording unit is provided to continuously copy the data items of all the frame IDs from the storage unit and collectively store the copied data items of all the frame IDs into the recording medium at the predetermined intervals, regardless of whether the data items of all the frame IDs in the storage unit are updated or not.

4. The data recording device according to claim 1 wherein the recording unit is provided to continuously copy the data items of all the frame IDs from the storage unit and collectively store the copied data items of all the frame IDs into the recording medium at the predetermined intervals, regardless of whether the data items of all the frame IDs in the storage unit are updated or not.

5. A data recording method provided for use in an automotive vehicle, the data recording method comprising:
providing one or a plurality of nodes interconnected by a multiplex communication line in an in-vehicle network of the vehicle, each of the one or a plurality of nodes configured to create data items each corresponding to one of one or a plurality of data types unique to each node;
setting each data item to a data frame with an assigned frame ID unique to each data item's corresponding data type by each of the one or a plurality of nodes;
transmitting the data frames to the multiplex communication line by each of the one or a plurality of nodes;
assorting, by a recording unit, the data items contained in the data frames sent from the multiplex communication line, in accordance with the frame IDs of the data frames;
storing, by the recording unit, the assorted data items in a storage unit of the recording unit;
copying, by the recording unit, the data items of all the frame IDs from the storage unit; and
storing, by the recording unit, the copied data items of all the frame IDs into a non-transitory recording medium of the recording unit at predetermined intervals, regardless of whether the data items of the frame IDs in the storage unit are updated or not.

6. The data recording method according to claim 5 wherein said one or plurality of nodes transmit the data frames containing the data items with the uniquely assigned frame IDs, to the multiplex communication line at predetermined intervals.

7. The data recording method according to claim 6 wherein said copying the data items is provided to continuously copy the data items of all the frame IDs from the storage unit, and said storing the copied data items is provided to collectively store the copied data items of all the frame IDs into the recording medium at the predetermined intervals, regardless of whether the data items of all the frame IDs in the storage unit are updated or not.

8. The data recording method according to claim 5 wherein said copying the data items is provided to continuously copy the data items of all the frame IDs from the storage unit, and said storing the copied data items is provided to collectively store the copied data items of all the frame IDs into the recording medium at the predetermined intervals, regardless of whether the data items of all the frame IDs in the storage unit are updated or not.

* * * * *